United States Patent
Stempel et al.

(10) Patent No.: US 7,917,731 B2
(45) Date of Patent: Mar. 29, 2011

(54) METHOD AND APPARATUS FOR PREFETCHING NON-SEQUENTIAL INSTRUCTION ADDRESSES

(75) Inventors: Brian Michael Stempel, Raleigh, NC (US); Thomas Andrew Sartorius, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 11/461,883

(22) Filed: Aug. 2, 2006

(65) Prior Publication Data

US 2008/0034187 A1    Feb. 7, 2008

(51) Int. Cl.
 *G06F 9/32* (2006.01)
(52) U.S. Cl. ....................................... 712/207
(58) Field of Classification Search ............... 712/207
 See application file for complete search history.

(56) References Cited

U.S. PATENT DOCUMENTS

| | | | | |
|---|---|---|---|---|
| 4,943,908 A * | 7/1990 | Emma et al. | | 712/240 |
| 4,984,151 A * | 1/1991 | Dujari | | 712/241 |
| 5,642,500 A * | 6/1997 | Inoue | | 712/233 |
| 5,701,435 A * | 12/1997 | Chi | | 711/159 |
| 5,987,599 A * | 11/1999 | Poplingher et al. | | 712/238 |
| 6,012,134 A * | 1/2000 | McInerney et al. | | 711/207 |
| 6,119,222 A * | 9/2000 | Shiell et al. | | 712/238 |
| 6,212,603 B1 * | 4/2001 | McInerney et al. | | 711/125 |
| 6,324,643 B1 * | 11/2001 | Krishnan et al. | | 712/237 |
| 6,651,162 B1 | 11/2003 | Levitan et al. | | |
| 6,658,534 B1 * | 12/2003 | White et al. | | 711/137 |
| 6,665,776 B2 * | 12/2003 | Jouppi et al. | | 711/137 |
| 6,728,839 B1 * | 4/2004 | Marshall | | 711/137 |
| 6,912,650 B2 * | 6/2005 | Ukai et al. | | 712/237 |
| 2001/0044881 A1 * | 11/2001 | Fu et al. | | 711/137 |
| 2002/0087794 A1 * | 7/2002 | Jouppi et al. | | 711/126 |
| 2003/0204705 A1 * | 10/2003 | Oldfield et al. | | 712/207 |
| 2003/0233521 A1 * | 12/2003 | Pudipeddi et al. | | 711/137 |
| 2004/0133769 A1 * | 7/2004 | Chaudhry et al. | | 712/233 |
| 2005/0132173 A1 | 6/2005 | Moyer et al. | | |
| 2005/0257034 A1 * | 11/2005 | Caprioli et al. | | 712/237 |

(Continued)

OTHER PUBLICATIONS

Dundas (Improving Processor Performance by Dynamically Pre-Processing the Instruction Stream); PhD thesis, University of Michigan, 1998.*

(Continued)

*Primary Examiner* — Eddie P Chan
*Assistant Examiner* — Keith Vicary
(74) *Attorney, Agent, or Firm* — Nicholas J. Pauley; Peter M. Kamarchik; Jonathan Velasco

(57) ABSTRACT

A processor performs a prefetch operation on non-sequential instruction addresses. If a first instruction address misses in an instruction cache and accesses a higher-order memory as part of a fetch operation, and a branch instruction associated with the first instruction address or an address following the first instruction address is detected and predicted taken, a prefetch operation is performed using a predicted branch target address, during the higher-order memory access. If the predicted branch target address hits in the instruction cache during the prefetch operation, associated instructions are not retrieved, to conserve power. If the predicted branch target address misses in the instruction cache during the prefetch operation, a higher-order memory access may be launched, using the predicted branch instruction address. In either case, the first instruction address is re-loaded into the fetch stage pipeline to await the return of instructions from its higher-order memory access.

26 Claims, 6 Drawing Sheets

U.S. PATENT DOCUMENTS

| | | | |
|---|---|---|---|
| 2006/0200655 A1* | 9/2006 | Smith et al. | 712/238 |
| 2006/0224871 A1* | 10/2006 | Tran | 712/239 |
| 2008/0140996 A1* | 6/2008 | Morrow et al. | 712/207 |
| 2008/0209173 A1* | 8/2008 | Evers et al. | 712/207 |

OTHER PUBLICATIONS

Smith et al. (Smith) (Prefetching in Supercomputer Instruction Caches); This paper appears in: Supercomputing '92. Proceedings; Publication Date: Nov. 16-20, 1992; On pp. 588-597; Meeting Date: Nov. 16, 1992-Nov. 20, 1992.*

Guo et al. (Guo) (Energy Characterization of Hardware-Based Data Prefetching); This paper appears in: Computer Design: VLSI in Computers and Processors, 2004. ICCD 2004. Proceedings. IEEE International Conference on Publication Date: Oct. 11-13, 2004 On pp. 518-523.*

Lee et al. (Instruction Cache Fetch Policies for Speculative Execution); This paper appears in: Computer Architecture, 1995. Proceedings. 22nd Annual International Symposium onPublication Date: Jun. 22-24, 1995 On pp. 357-367.*

Srinivasan et al. (Branch History Guided Instruction Prefetching) Proceedings of the 7th International Symposium on High-Performance Computer Architecture; p. 291; Year of Publication: 2001.*

Chen et al. (Instruction prefetching using branch prediction information )Computer Design: VLSI in Computers and Processors, 1997. ICCD '97. Proceedings., 1997 IEEE International Conference on Publication Date: Oct. 12-15, 1997; On pp. 593-601.*

Smith (Cache Memories); ACM Computing Surveys (CSUR); vol. 14, Issue 3 (Sep. 1982) pp. 473-530 Year of Publication: 1982.*

Mutlu et al. (Runahead Execution: An Effective Alternative to Large Instruction Windows); This paper appears in: High-Performance Computer Architecture, 2003. HPCA-9 2003. Proceedings. The Ninth International Symposium on Publication Date: Feb. 8-12, 2003; On pp. 129-140.*

Reinman (Fetch Directed Instruction Prefetching); Microarchitecture, 1999. MICRO-32. Proceedings. 32nd Annual International Symposium on; Publication Date: 1999; On pp. 16-27.*

Chiu et al. (Instruction Cache Prefetching Directed by Branch Prediction); This paper appears in: Computers and Digital Techniques, IEE Proceedings; Publication Date: Sep. 1999; vol. 146, Issue: 5; On pp. 241-246.*

Chen et al. (Instruction Prefetching using Branch Prediction Information); This paper appears in: Computer Design: VLSI in Computers and Processors, 1997. ICCD '97. Proceedings., 1997 IEEE International Conference on; Publication Date: Oct. 12-15, 1997; On pp. 593-601.*

Veidenbaum (Instruction Cache Prefetching Using Multilevel Branch Prediction); International Symposium on High Performance Systems; 1997, 20 pages.*

Hsu et al. (A Performance Study of Instruction Cache Prefetching Methods); IEEE Transaction on Computers; May 1998 (vol. 47 No. 5); pp. 497-508.*

Zhang et al. (Execution History Guided Instruction Prefetching); Journal of supercomputing; 2004, vol. 27, pp. 129-147.*

Huang et al. (Instruction Prefetching and Object-Oriented Programs); accessible at http://www.cs.cmu.edu/~pach/740/final/final.html; Dated Nov. 22, 1999, Retrieved Jan. 6, 2010; 19 pages.*

* cited by examiner

| | CYCLE 1 | CYCLE 2 | CYCLE 3 | CYCLE 4 | CYCLE 5 | CYCLE 6 | CYCLE 7 | CYCLE 8 | CYCLE 9 |
|---|---|---|---|---|---|---|---|---|---|
| PREFETCH REGISTER | -- | -- | -- | A + 0x20 | -- | -- | -- | -- | -- |
| FETCH1 | A | A + 0x8 | A + 0x10 | A + 0x20 | -- | -- | A | A + 0x8 | A + 0x10 |
| FETCH2 | | A | A + 0x8 | A + 0x10 | -- | A + 0x20 | A | A + 0x8 |
| FETCH3 | | | A | A + 0x8 | -- | | | A + 0x20 | A |
| $ ACCESS 1 | A | | | A | | A + 0x20 | | | |
| $ ACCESS 2 | | A | | | A + 0x20 | | A + 0x20 | | |
| I-$ HIT OR MISS | | MISS (A) | | | | | MISS (A + 0x20) | | |
| L2 $ REQUEST | | | A | | | | | A + 0x20 | |
| BTAC HIT OR MISS | | MISS | | | | | SUPPRESSED | | |
| BRANCH PREDICTION | | NOT TAKEN | | | | | SUPPRESSED | | |

FIG. 4

| | CYCLE 1 | CYCLE 2 | CYCLE 3 | CYCLE 4 | CYCLE 5 | CYCLE 6 | CYCLE 7 | CYCLE 8 | CYCLE 9 |
|---|---|---|---|---|---|---|---|---|---|
| PREFETCH REGISTER | -- | -- | -- | B | -- | -- | -- | -- | -- |
| FETCH1 | A | A + 0x8 | B* | B + 0x8 | -- | B | A | A + 0x8 | B* |
| FETCH2 | | A | -- | B* | -- | | B | A | -- |
| FETCH3 | | | A | A | -- | | A | B | A |
| $ ACCESS 1 | A | A | B | B | | B | A | A | B |
| $ ACCESS 2 | | | | | | | B | A | |
| I-$ HIT OR MISS | | MISS (A) | | | | | MISS (B) | MISS (A) | |
| L2 $ REQUEST | | | A | | | | | | |
| BTAC HIT OR MISS | | HIT (A) | | | | | SUPPRESSED (B) | HIT (A) | |
| BRANCH PREDICTION | | TAKEN | | | | | SUPPRESSED (B) | TAKEN | |

FIG. 5

* = BTA FLAG

| PREFETCH REGISTER | -- | -- | -- | -- | B | B | -- | -- | -- | -- | -- |
|---|---|---|---|---|---|---|---|---|---|---|---|
| FETCH1 | A | A + 0x8 | A + 0x10 | B* | B* | -- | B | A | A + 0x8 | A + 0x10 | B* |
| FETCH2 |  | A | A + 0x8 | A + 0x8 | A + 0x8 | -- |  | B | A | A + 0x8 | A + 0x8 |
| FETCH3 |  |  | A | A | A | -- |  |  | B | A | A |
| $ ACCESS 1 | A |  |  |  |  |  | B |  |  |  |  |
| $ ACCESS 2 |  | A |  |  |  |  |  | B |  |  |  |
| I-$ HIT OR MISS |  | MISS (A) | MISS (A + 0x8) |  |  |  |  | MISS (B) |  |  |  |
| L2 $ REQUEST |  |  |  | A |  |  |  |  | B |  |  |
| BTAC HIT OR MISS |  | MISS (A) | HIT (A + 0x8) |  |  |  |  | SUPPRESSED (B) | MISS (A) | HIT (A + 0x8) |  |
| BRANCH PREDICTION |  | NOT TAKEN | TAKEN |  |  |  |  | SUPPRESSED (B) | NOT TAKEN | TAKEN |  |
| CYCLE | 1 | 2 | 3 | 4 | 5 | 6 | 7 | 8 | 9 | 10 | 11 |

* = BTA FLAG

FIG. 6

METHOD AND APPARATUS FOR PREFETCHING NON-SEQUENTIAL INSTRUCTION ADDRESSES

BACKGROUND

1. Field of the Invention

The present invention generally relates to prefetching of processor instructions, and particularly relates to non-sequential instruction prefetching.

2. Relevant Background

Microprocessors perform computational tasks in a wide variety of applications, including portable electronic devices. In many cases, maximizing processor performance is a major design goal, to permit additional functions and features to be implemented in portable electronic devices and other applications. Additionally, power consumption is of particular concern in portable electronic devices, which have limited battery capacity. Hence, processor designs that increase performance and reduce power consumption are desirable.

Most modern processors employ one or more instruction execution pipelines, wherein the execution of many multistep sequential instructions is overlapped to improve overall processor performance. Capitalizing on the spatial and temporal locality properties of most programs, recently executed instructions are stored in a cache—a high-speed, usually on-chip memory—for ready access by the execution pipeline.

Many processors employ two levels of high-speed caches. In such processors, the first level conventionally comprises a data cache for storing data and an instruction cache for storing instructions. The data and instruction caches may be separate or unified. A second level (L2) cache provides a high-speed memory buffer between the first-level caches and memory external to a microprocessor, e.g., Dynamic Random Access Memory (DRAM), flash memory, hard disk drives, optical drives, and the like.

A common style of cache memory comprises a Content Addressable Memory (CAM) coupled to a Random Access Memory (RAM). The cache is accessed by comparing a memory address against full or partial, previously accessed, memory addresses stored in the CAM. If the address matches a CAM address, the cache indicates a "hit," and may additionally provide a "line" of data (which, in the case of an instruction cache, may comprise one or more instructions) from a location in the RAM that corresponds to the matching CAM address. If the compare address does not match any memory address stored in the CAM, the cache indicates a "miss." A miss in a first-level cache normally triggers an L2 cache access, which requires a much larger number of processing cycles than a first-level cache access. A miss in the L2 cache triggers an access to main memory, which incurs an even larger delay.

The CAM comparison (e.g., determining whether or not an address hits in the cache) is relatively power efficient. However, retrieving instructions or data from the cache RAM in the event of a hit consumes a large amount of power. Accordingly, some processors utilize a prefetch operation to advantageously ascertain whether or not desired instructions are stored in an instruction cache, without incurring the power penalty of actually retrieving those instructions from the cache at that time. As used herein, the term "prefetch" or "prefetch operation" refers to a limited instruction cache access that yields a hit or miss, indicating whether or not one or more instructions associated with an instruction address are stored in the instruction cache, without retrieving the instructions from the cache if the address hits. That is, a prefetch operation accesses an instruction cache CAM, but not the RAM. As used herein, the term "fetch" or "fetch operation" refers to a memory operation that includes an instruction cache access that retrieves one or more instructions from the cache in the case of a cache hit. As discussed more fully herein, a fetch operation additionally accesses branch prediction circuits, such as a branch target address cache and branch history table, while a prefetch operation does not. It should be noted that both fetch and prefetch operations—which both perform instruction cache accesses—may take place in the same section of the processor pipeline.

Conventional instruction prefetching involves performing instruction cache hit/miss lookups based on sequential instruction addresses. For example, if a first instruction address causes an instruction cache miss, the L2 cache access time for that address may be utilized to calculate a second address, that of the next sequential cache line. Prefetching this second address ascertains whether the sequential cache line resides in the instruction cache. If it does not (i.e., the second address misses), an L2 cache fetch for the next sequential cache line may be initiated, effectively hiding it behind the access time for the first L2 cache access. On the other hand, if the next sequential cache line does reside in the instruction cache (i.e., the second address hits), the prefetch does not read the RAM, and no L2 request is initiated. At this point, the prefetch is deemed to have completed. The prefetch operation thus allows for overlapped L2 accesses if the address of the next sequential cache line misses the instruction cache, but does not incur the power cost of actually fetching the sequential instructions if the address hits. Prefetching sequential instruction addresses provides both performance and power management improvements when executing software that contains few or no branch instructions. However, prefetching sequential instruction addresses does not provide an advantage when executing software containing frequent branch instructions, since the instructions prefetched from sequential addresses are not likely to be executed due to the branches.

SUMMARY OF THE DISCLOSURE

According to one or more embodiments, a prefetch operation is performed on non-sequential (i.e., branch) instruction addresses. In particular, if a first instruction address misses in an instruction cache and accesses a higher-order memory as part of a fetch operation, and a branch prediction circuit detects a branch instruction associated with the first instruction address or an address following the first instruction address and further predicts that the branch will evaluate taken, a prefetch operation is performed using a predicted branch target address in lieu of the next sequential cache line address, during the higher-order memory access. If the predicted branch target address hits in the instruction cache during the prefetch operation, associated instructions are not retrieved, to conserve power. If the predicted branch target address misses in the instruction cache, a higher-order memory access will be launched, using the predicted branch instruction address. In either case, the first instruction address is re-loaded into the fetch stage pipeline to await the return of instructions from its higher-order memory access.

One embodiment relates to a method of fetching instructions. An instruction cache is accessed with a first instruction address that causes a cache miss. A second instruction address is obtained, that is the branch target address of a predicted-taken branch instruction associated with the first instruction address or an address following the first instruction address. A higher-level memory transaction is initiated to retrieve one or more instructions associated with the first instruction address.

During the higher-level memory transaction, the presence, if any, in the instruction cache, of one or more instructions associated with the second instruction address is ascertained, without retrieving any instructions from the instruction cache.

Another embodiment relates to a method of fetching instructions. One or more instructions is fetched with a first instruction address. If the first instruction address misses in a first-level instruction cache and initiates a higher-order memory access and a branch instruction associated with the first instruction address or an address following the first instruction address is predicted taken, instructions are prefetched with a second instruction address that is the predicted branch target address of the branch instruction, during the higher-order memory access of the first instruction address.

Still another embodiment relates to a processor. The processor includes an instruction cache memory operative to provide a hit or miss indication for an applied instruction address in a fetch or prefetch operation, and to further provide instructions in a fetch operation. The processor also includes a higher-order memory operative to provide instructions if an applied instruction address misses the instruction cache in a fetch operation; an instruction execution pipeline including a fetch stage pipeline; and a branch prediction circuit operative to detect a branch instruction associated with a first instruction address or an address following the first instruction address and to provide a branch evaluation prediction and a predicted branch target address. The processor further includes control circuits operative to launch a prefetch operation in the fetch stage pipeline using the predicted branch target address when the first instruction address misses the instruction cache and accesses the higher-order memory and the branch prediction circuit predicts a taken branch in a fetch operation in the fetch stage pipeline using the first instruction address or an address following the first instruction address.

Of course, the present invention is not limited to the above features and advantages. Those skilled in the art will recognize additional features and advantages upon reading the following detailed description, and upon viewing the accompanying drawings.

BRIEF DESCRIPTION OF DRAWINGS

FIG. 4 is a state diagram depicting the flow of sequential addresses through prefetch and fetch stages of an instruction unit.

FIG. 5 is a state diagram depicting the flow of non-sequential addresses through prefetch and fetch stages of an instruction unit.

FIG. 6 is a state diagram depicting the flow of non-sequential addresses through prefetch and fetch stages of an instruction unit wherein a branch instruction is associated with an address following the instruction address launching a higher-order memory access.

DETAILED DESCRIPTION

Figure 1:
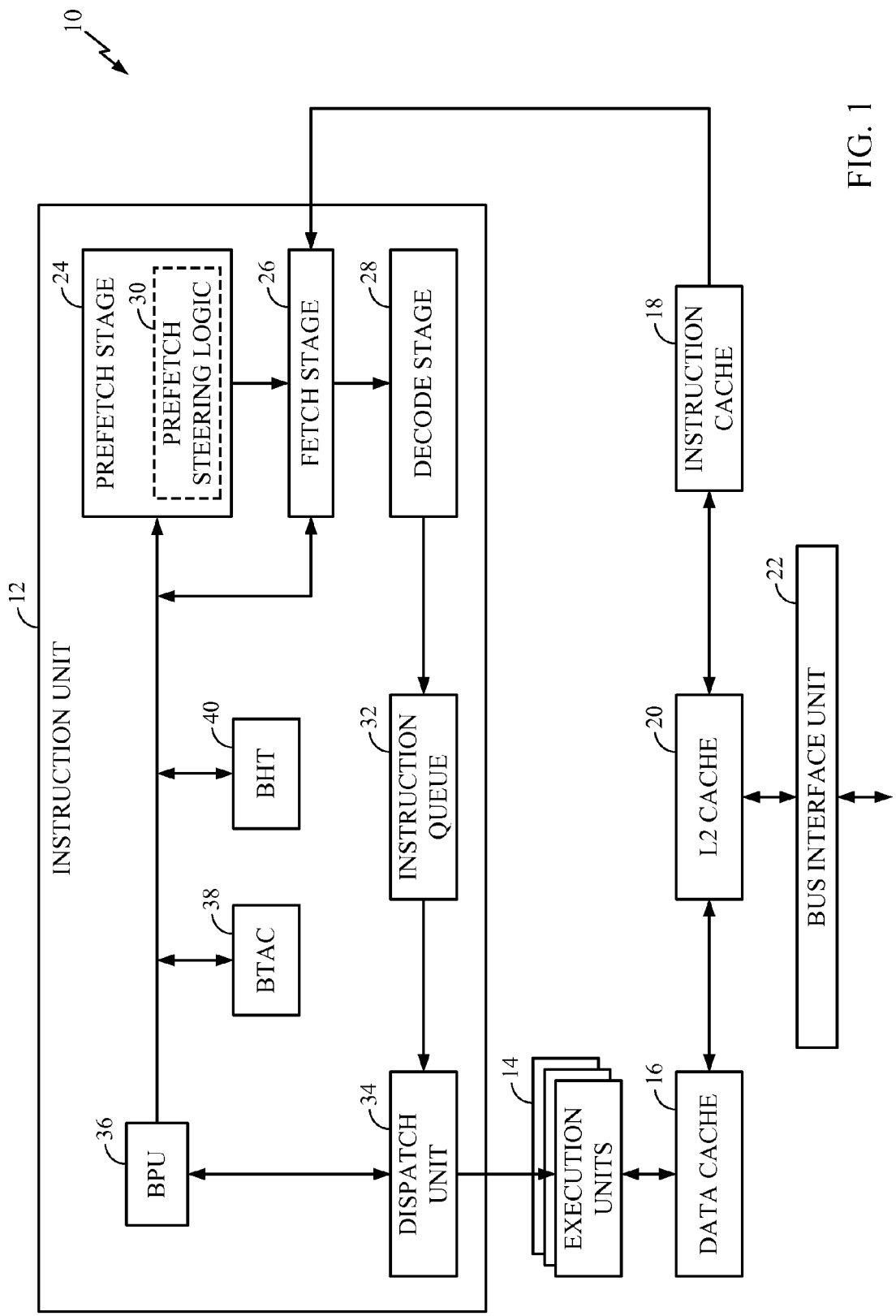
FIG. 1 is a functional block diagram of a processor.

FIG. 1 illustrates an embodiment of a processor 10 that performs both sequential and non-sequential instruction prefetching. If the address of an instruction fetch group being fetched misses in the instruction cache, a higher-order memory access is initiated. In response, while the memory access is pending, if a branch instruction within the fetch group associated with that address of a following instruction address is predicted to be taken, the processor 10 obtains and prefetches the branch target address associated with the predicted taken branch instruction. If the first address misses and the fetch group includes no branch instruction that is predicted taken, the processor 10 prefetches the address of the next sequential cache line. In either case, if the prefetch address misses in the instruction cache, a higher-order memory access is initiated. Alternatively, if the prefetch address hits in the instruction cache, the prefetch operation is complete, without expending the power to retrieve instructions from the instruction cache.

In more detail, the processor 10 includes an instruction unit 12, one or more execution units 14, first-level data and instruction caches 16, 18, a second-level (L2) cache 20, and a bus interface unit 22. The instruction unit 12 provides centralized control of instruction flow to the execution units 14. The execution units 14 execute instructions dispatched by the instruction unit 12. The data and instruction caches 16, 18 store data and instructions, respectively. The L2 cache 20 provides a high-speed memory buffer between the data and instruction caches 16, 18 and memory (not shown) external to the processor 10 while the bus interface unit 22 provides a mechanism for transferring data, instructions, addresses, and control signals to and from the processor 10.

The instruction unit 12 includes a prefetch stage 24, fetch stage 26, and decode stage 28. The prefetch stage 24, under control of prefetch steering logic 30, executes one of two instruction prefetching techniques based on the presence of predicted-taken branch instructions in the instruction fetch group presently being fetched. The fetch stage 26 retrieves instruction data from the instruction cache 18, the L2 cache 20, and/or main memory (not shown), and the decode stage 28 decodes retrieved instructions. The instruction unit 12 further includes an instruction queue 32, an instruction dispatch unit 34 and a Branch Prediction Unit (BPU) 36. The instruction queue 32 stores instructions decoded by the decode stage 28 and the instruction dispatch unit 34 dispatches queued instructions to the appropriate execution units 14. The BPU 36 detects branch instructions and, depending upon the type of branch detected, executes various branch prediction mechanisms, e.g., by predicting branch target addresses and/or whether a particular branch will be taken or not taken.

To assist in branch detection and prediction, the instruction unit 12 includes a Branch Target Address Cache 38 (BTAC) and a Branch History Table 40 (BHT). The BTAC 38 stores branch target addresses associated with previously executed branch instructions. Traditional BTACs comprise a plurality of entries, each indexed by an instruction address corresponding to a single, known, branch instruction that has previously evaluated taken, and each BTAC entry supplying a single branch target address corresponding to the branch instruction. Modern processors often fetch two or more instructions at a time. Accordingly, BTAC entries may be associated with more than one instruction.

Patent application Ser. No. 11/382,527, "Block-Based Branch Target Address Cache," assigned to the assignee of the present application and incorporated herein by reference, discloses a block-based BTAC storing a plurality of entries, each entry associated with a block of instructions, where one or more of the instructions in the block is a branch instruction that has been evaluated taken. The BTAC entry includes an indicator of which instruction within the associated block is a taken branch instruction, and the branch target address of the taken branch. The BTAC entries are indexed by the address bits common to all instructions in a block (i.e., by truncating the lower-order address bits that select an instruction within the block). Both the block size and the relative block borders are thus fixed.

Patent application Ser. No. 11/422,186, "Sliding-Window, Block-Based Branch Target Address Cache," assigned to the assignee of the present application and incorporated herein by reference, discloses a block-based BTAC in which each BTAC entry is associated with a fetch group, and is indexed by the address of the first instruction in the fetch group. Because fetch groups may be formed in different ways (e.g., beginning with the target of another branch), the group of instructions represented by each BTAC entry is not fixed. Each BTAC entry includes an indicator of which instruction within the fetch group is a taken branch instruction, and the branch target address of the taken branch.

As used herein, the one or more instructions fetched from the instruction cache 18 in a single instruction fetch operation are referred to as a "fetch group," regardless of the number of instructions in the group, the structure of the group, or the addressing mechanism utilized to define and address it. The non-sequential prefetching disclosed and claimed herein is advantageously applicable to prefetching instructions whether the instructions are fetched singly or in blocks or groups. The use herein of the term "fetch group" to refer to the one or more instructions retrieved in a single fetch operation is not limiting.

The BHT 40, accessed in parallel with the BTAC 38 and the instruction cache 18 during fetch operations, provides the BPU 36 with branch predictions. The BHT 40, in one embodiment, comprises an array of, e.g., two-bit saturation counters, each associated with a branch instruction. In one embodiment, a counter may be incremented every time a branch instruction evaluates taken, and decremented when the branch instruction evaluates not taken. The counter values then indicate both a prediction (by considering only the most significant bit) and a strength or confidence of the prediction, such as:

| | |
|---|---|
| 11 | Strongly predicted taken |
| 10 | Weakly predicted taken |
| 01 | Weakly predicted not taken |
| 00 | Strongly predicted not taken |

The BHT 40 is indexed by part of the instruction address, in parallel with the BTAC 40. To improve accuracy and make more efficient use of the BHT 40, the instruction address may be logically combined with recent global branch evaluation history (gselect or gshare) prior to indexing the BHT 40, as known in the art.

The BPU 36 of the instruction unit 12 uses the information maintained by the BTAC 38 and BHT 40 to detect a branch instruction in the instruction fetch group presently being fetched, predict its evaluation, and provide a predicted branch target address. As discussed herein, if the instruction fetch group address misses in the instruction cache, the instruction unit 12 prefetches the predicted branch target address to determine if instructions associated with it are resident in the instruction cache, and if not, to launch a higher-order memory access to retrieve instructions at the predicted branch target address, during the latency of a higher-order memory access for the instruction fetch group address.

Figure 2:
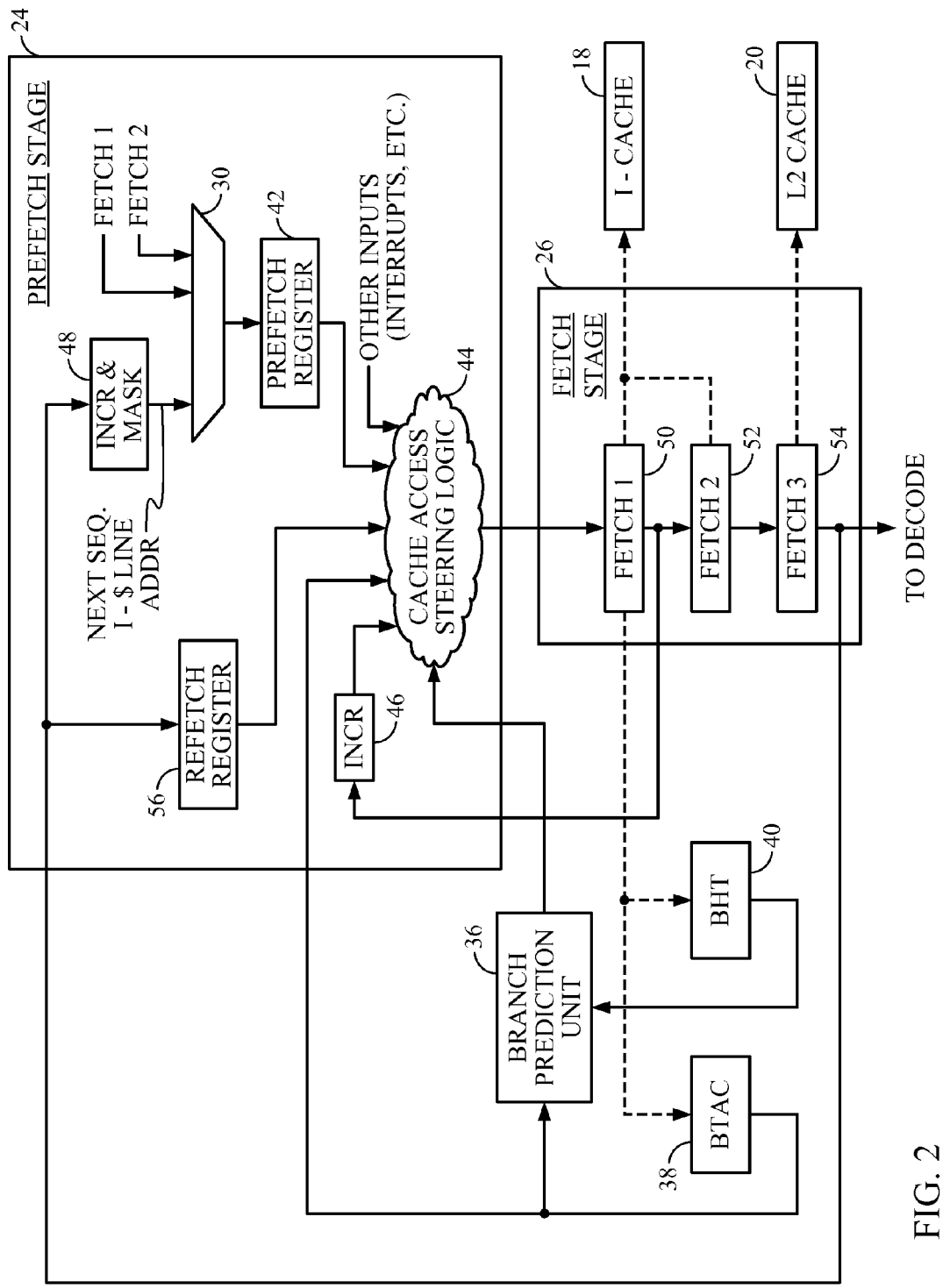
FIG. 2 is a functional block diagram of prefetch and fetch stages of a processor instruction unit.

FIG. 2 illustrates one embodiment of the prefetch and fetch stages 24-26, as well as selected elements of the instruction unit 12. Note: the dashed lines shown in FIG. 2 connecting the BTAC 38, BHT 40, instruction cache 18 and L2 cache 20 with the fetch stage 26 illustrate that the fetch stage 26 has access to these elements, but does not necessarily imply direct physical connections. The prefetch stage 24 includes the prefetch steering logic or mux 30, a register 42 for holding prefetch addresses, a refetch register 56, cache access steering logic 44, incrementer 46, and increment-and-mask circuit 48.

The prefetch steering mux 30 directs either the address of the next sequential instruction cache line or a non-sequential instruction address (from either FETCH1 or FETCH2) into the prefetch register 42. The decision as to which instruction address to steer is based on whether the fetch group currently being accessed from higher-level memory—the L2 cache 20 or external memory—includes a known, predicted-taken, branch instruction. That is, if one of the instructions currently being fetched from higher-level memory is a predicted taken branch instruction, then the branch target address for that instruction is prefetched to ascertain whether instructions associated with that address reside in the instruction cache 18. Otherwise, the address of the next sequential cache line is prefetched, i.e., the address in FETCH3 altered by the increment-and-mask logic 48.

The fetch stage 26 includes two instruction cache access pipeline stages: the FETCH1 stage 50 and the FETCH2 stage 52, each comprising registers and logic for accessing the instruction cache 18 for either a fetch or prefetch operation. In addition, the fetch stage 26 also includes a third fetch pipeline stage, the FETCH3 stage 54, for accessing higher-level memory, such as the L2 cache 20, in the event of a miss in the instruction cache 18. In some embodiments, accessing a cache takes multiple processing cycles, thus involving multiple instruction cache access pipeline stages 50, 52. In other embodiments, a cache lookup may be performed entirely in one processing cycle, thus requiring only one instruction cache access pipeline stage. For ease of explanation only, the embodiments described hereinafter correspond to a two-cycle access instruction cache 18, where address compares are done during the first cycle and compare results are provided during the second cycle. However, those skilled in the art will readily recognize that the fetch stage 26, which performs cache lookups, may comprise any number of pipeline stages suitable for accommodating instruction caches having any number of access cycles, e.g., a single-cycle access cache.

Figure 3:
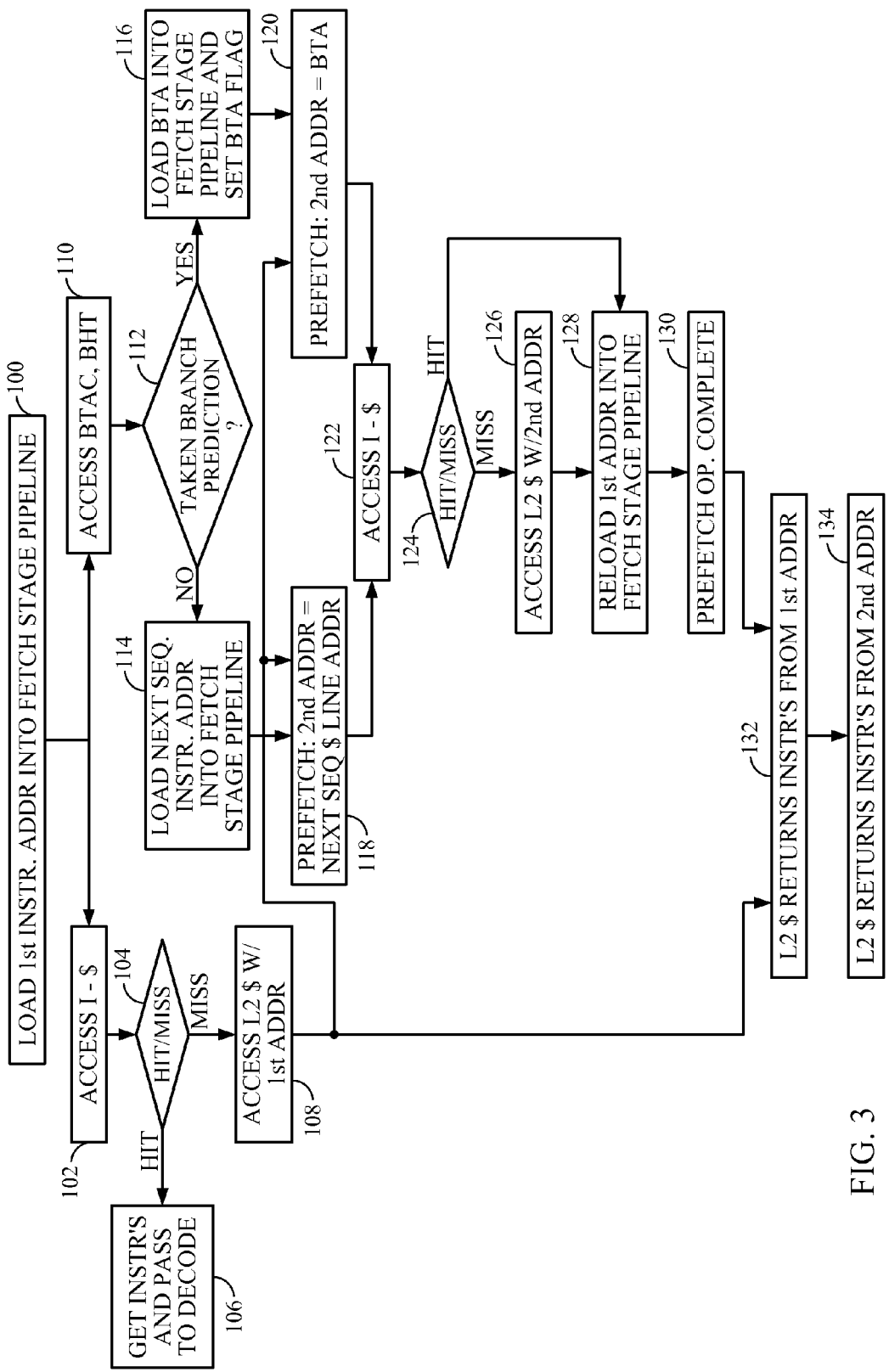
FIG. 3 is a flow diagram depicting a method of prefetching instruction addresses.

A first instruction address, associated with a fetch group of instructions, is loaded into the fetch stage 26 pipeline, as illustrated at block 100 of the flow diagram of FIG. 3. The instruction cache access pipeline stages—the FETCH1 stage 50 and the FETCH2 stage 52—perform a cache access in a fetch operation to retrieve a fetch group of instructions from the instruction cache 18 (block 102). An instruction cache lookup is performed by comparing a first instruction address in the FETCH1 stage 50 to addresses or partial addresses stored in the CAM structure of the instruction cache 18 during a first cache access cycle. During the second cycle, the address in the FETCH1 stage 50 drops into the FETCH2 stage 52 and the instruction cache 18 indicates a hit or miss (block 104). In the event of a hit, the corresponding instructions are retrieved from the instruction cache 18 and provided to the decode stage 28 (block 106) after the first instruction address passes through the FETCH3 stage 54. In the event of a miss, the first instruction address is provided to the FETCH3 stage 54 where a higher-level memory transaction, such as an L2 cache 20 access, is initiated, (block 108).

Simultaneously with the instruction cache 18 access during the first cache access cycle (block 102), the first instruction address is presented to the BTAC 38 and BHT 40 as part of the fetch operation (block 110). A hit in the BTAC 38 indicates that a branch instruction in the targeted fetch group has previously evaluated taken, and the BHT 40 entry corresponding to the first instruction address provides an indication of recent evaluations of the branch instruction. This information is utilized by the BPU 36 to formulate a branch prediction (block 112), which is provided to the cache access steering logic 44 in the prefetch stage 24. The cache access steering logic 44 steers the branch target address from the BTAC 38 into the FETCH1 stage 50 if a branch instruction is detected and predicted taken (block 116). In one embodiment, a branch target address (BTA) flag is set when this occurs, and the BTA flag accompanies the branch target address through the fetch stage 26 pipeline, indicating that the address was loaded from the BTAC 38. If no branch instruction is detected, or a branch is predicted not taken, the cache access steering logic 44 loads a sequential address into the FETCH1 stage 50 (e.g., the next successive fetch group), via the incrementer 46, operating on the output of the FETCH1 stage 50 (block 114).

If the first instruction address missed in the instruction cache (block 104) and launched a higher-order memory access (block 108), the prefetch stage 24 initiates a prefetch operation, performing the prefetch operation during the latency of the ongoing higher-level memory transaction. That is, while an L2 cache or main memory transaction is in process, a subsequent instruction cache 18 access is performed—one that does not return any instructions in the event of a cache 18 hit but initiates a higher-order memory access in the event of a cache 18 miss—thus "hiding" the prefetch operation behind the higher-order memory access. In one embodiment, the prefetch stage 24 initiates a prefetch operation in response to the an L2 access request launched from the FETCH3 stage 54.

The instruction address to be concurrently prefetched—referred to herein as the second instruction address—may be sequential or non-sequential to the first instruction address accessing higher-order memory. If the BTAC 38 indicates no branch instruction in the fetch group currently being fetched, or if the BPU 36 predicts a branch to evaluate not taken, the instruction address to be concurrently prefetched is the address of the next sequential cache line following the cache line currently being fetched (block 118). This address is generated by an increment-and-mask circuit 48, operating on the output of the FETCH3 stage 54. Alternatively, if the fetch group currently being fetched includes a branch instruction, and the branch is predicted taken, then the instruction address to be concurrently prefetched is the branch target address provided by the BTAC 38 (block 120), which is automatically loaded into the fetch stage 26 pipeline, along with a BTA flag, as a result of the BTAC 38 hit and the taken prediction by the BPU 36. In either case, the second address is only prefetched if the first address missed in the instruction cache 18 (block 104) and launched a higher-order memory access (block 108).

Referring to FIG. 2, the second instruction address—the sequential address or the branch target address from the FETCH1 stage 50 or FETCH2 stage 52—is selected by the prefetch steering mux 30 and loaded into the prefetch register 42. In one embodiment, the FETCH1 or FETCH2 leg is selected in response to the BTA flag in the corresponding register 50, 52, indicating that the associated address was loaded into the fetch stage 26 pipeline from the BTAC 38. If no BTA flag is detected, the next sequential cache line address is loaded from the increment-and-mask logic 48.

The prefetch register 42 is one of a plurality of inputs to the cache access steering logic 44 (other inputs may include interrupt vector addresses, and the like). Although not depicted in FIG. 2, certain attributes are included in the prefetch register 42, along with the instruction address to be prefetched. These attributes distinguish a prefetch operation from a fetch operation, and the attributes propagate through the fetch stage 26 pipeline along with the second instruction address, as the instruction cache 18 is accessed in a prefetch operation, using the second instruction address. Neither the second instruction address nor the prefetch attributes are passed to the decode stage 28 as part of the prefetch operation, which terminates in the fetch stage 26 without retrieving any instructions.

A prefetch operation differs from a fetch operation in at least three significant respects. First, if a prefetch instruction address hits in the instruction cache 18, the cache 18 does not return any instructions, providing a significant power savings. Second, during a fetch operation the BTAC 38 and BHT 40 are accessed simultaneously with the instruction cache 18; in a prefetch operation, further power savings are realized by suppressing the BTAC 38 and BHT 40 accesses. Third, if the prefetch instruction address hits in the instruction cache 18, the prefetch operation is complete, and the address is flushed from the fetch stage 26 pipeline. If the prefetch instruction address misses in the instruction cache 18, it initiates its own higher-order memory access prior to being flushed from the fetch stage 26 pipeline. In contrast, a fetch operation completes by providing instructions to the decode stage. Note that both the fetch and prefetch operations occur in the fetch stage 26 pipeline.

In the embodiment depicted in FIG. 2, the branch target address of a predicted-taken branch instruction in a fetch group currently accessing a higher-order memory is automatically loaded into the fetch stage 26 pipeline, and a BTA flag is set, when the branch instruction is detected and predicted taken. The branch target address is then cycled through the prefetch selection mux 30 and prefetch register 42, in response to the BTA flag, prior to being re-loaded into the fetch stage 26 pipeline for a prefetch operation. This is to take advantage of the prefetch attributes that automatically define a prefetch operation (as opposed to a fetch operation) for any instruction address entering the fetch stage 26 pipeline from the prefetch register 42. In another embodiment, such as one with a relatively low-latency L2 cache 20, the fetch operation that defaults when the branch target address is loaded into the fetch stage 26 pipeline as a result of a BTAC 38 hit and BPU 36 taken prediction may be converted "on the fly" to a prefetch operation, without cycling the branch target address through the prefetch register 42. Those of skill in the art will recognize the optimal implementation for the constraints of a given application, given the teaching of the present disclosure.

Whether the second instruction address is the address of the next sequential cache line to the fetch group currently accessing higher-order memory (FIG. 3, block 118) or the branch target address of a predicted taken branch instruction in that fetch group (block 120), it is provided to the instruction cache 18 for a cache lookup at the FETCH1 stage 50 and FETCH2 stage 52 (block 122). If the second address hits in instruction cache 18 (block 124), the second address is flushed from the fetch stage 26 pipeline, the first instruction address is reloaded into the fetch stage 26 pipeline (block 128), and the prefetch operation is complete (block 130). On the other hand, if the second instruction address misses in the instruction cache 18 (block 124), it propagates to the FETCH3 stage 54, and initiates a second higher-order memory access, such as an L2 cache 20 access (block 126), prior to being flushed from the fetch stage 26 pipeline.

In either case, the first instruction address has meanwhile been stored in the refetch register 56, and is subsequently loaded into the fetch stage 26 pipeline through the cache access steering logic 44 (block 128), so that the first instruction address will be at the FETCH3 stage 54 when instructions are returned from the first higher-order memory access. This completes the prefetch operation, and the second address is flushed from the fetch stage 26 pipeline (block 130). Since the first instruction does not enter the cache access steering logic 44 from the prefetch register 42, a fetch operation is initiated when the first instruction re-enters the fetch stage 26 pipeline. The first instruction will (again) miss in the instruction cache 18. The fetch operation will access the BTAC 38 and BHT 40, and the BPU 36 will (again) formulate (the same) branch prediction and provide it to the cache access steering logic.

In the event of a predicted taken branch, the branch target address (which is the second, or prefetched, instruction address) is loaded into the fetch stage 26 pipeline, with a BTA flag, by the cache access steering logic 44 and a fetch operation is initiated. This second address will (again) miss in the instruction cache 18. However, its access of a higher-order memory (e.g., an L2 cache 20 access) has already been initiated during the prefetch operation. The first instruction address will propagate to the FETCH3 stage 54 and await its instructions from the higher-order memory (block 132). The second instruction address is behind it, with its corresponding higher-order memory access already launched, and will similarly arrive at the FETCH3 stage 54 and await its instructions from the higher-order memory (block 134).

FIG. 4 illustrates a cycle-by-cycle movement of instruction addresses through the prefetch stage 24 and fetch stage 26 of the instruction unit 12 in response to a first instruction address A. In this example, address A results in an instruction cache 18 miss during a cache lookup and L2 cache 20 access, and the fetch group associated with address A contains no known branch instructions or one or more branch instructions predicted by the BPU 36 to be not taken.

During the first processing cycle, a fetch operation begins by loading A into the FETCH1 stage 50 and simultaneously accessing of the instruction cache 18, the BTAC 38, and the BHT 40. Address A is then loaded into the FETCH2 stage 52 during the second processing cycle, and the results of the compare indicate a cache 18 miss and a BTAC miss and/or not taken branch prediction. Also during the second cycle, the next sequential instruction address (A+0x8, in the illustrative and non-limiting case of a fetch group containing eight bytes) is loaded into the FETCH1 stage 50, via the incrementer 46 operating on the output of the FETCH1 stage 50. During the third cycle, the fetch process continues as A is loaded into the FETCH3 stage 54 and a corresponding L2 cache 20 or main memory access request is initiated. Also, A+0x8 is dropped into the FETCH2 stage 52 and the next sequential instruction address (A+0x10) is loaded into to the FETCH1 stage 50.

Since address A is not loaded into the fetch stage 26 pipeline from the BTAC 38, the BTA flag in the FETCH1 stage 50 and the FETCH2 stage 52 is not set during the previous processing cycles. As a result, during the fourth processing cycle, the prefetch steering mux 30 directs the address of the next sequential cache line (A+0x20), computed by the increment-and-mask circuit 48 operating on the output of the FETCH3 stage 54, to the prefetch register 42. In response to the prefetch register 42 being loaded with a valid address, the fetch stage 26 pipeline is flushed during the fourth cycle, leaving it invalid during the fifth cycle, to allow the prefetch operation to flow freely through the pipeline.

The second address A+0x20 is loaded into the FETCH1 stage 50 during cycle six, which triggers a limited cache 18 access but not a BTAC 38 or BHT 40 access. During the second cycle of the cache 18 access (cycle seven), A+0x20 is loaded into the FETCH2 stage 52 while A is re-loaded from the refetch register 56 into the FETCH1 stage 50. A is re-loaded into the FETCH1 stage 50 so that ultimately, when the L2 access completes for the first instruction A, A will be waiting in the FETCH3 stage 54 (as it would have been waiting had no prefetch operation occurred). Thus, the instruction cache lookup for the second instruction A+0x20 is hidden behind the higher-level memory transaction associated with the first instruction A.

In the present example, the instruction cache 18 access by the second instruction A+0x20 results in a cache miss. This triggers an L2 cache 20 access request for the second instruction A+0x20 during the cycle eight, which is also "hidden" by the latency of the L2 cache 20 access by the first instruction A. The remaining cycles illustrated in FIG. 4 show that A, A+0x8, and A+0x10 are reprocessed by the prefetch and fetch stages 24, 26, thus ensuring that those addresses will be ready for decode when the fetch group associated with the first instruction A is returned, all the while accommodating an instruction cache lookup and L2 cache 20 request for the second instruction A+0x20.

FIG. 5 illustrates a cycle-by-cycle movement of instruction addresses through the prefetch and fetch stages 24, 26 of the instruction unit 12 in response to a first instruction address A, which also misses in the instruction cache 18 and launches and L2 cache 20 access. Unlike the previous example, the fetch group associated with address A includes a known branch instruction that is predicted taken.

During processing cycles one and two, instruction address A causes a miss in the instruction cache 18, a hit in the BTAC 38, and a taken prediction by the BPU 36. Accordingly, in cycle three, the cache access steering logic 44 directs the branch target address B from the BTAC 38 to the FETCH1 stage 50 and also sets the BTA flag (indicated by *) in the FETCH1 stage 50. The first instruction address A is loaded into the FETCH3 stage 54, and an L2 cache 20 request is issued. In response to the branch prediction, all sequential instruction addresses following A are flushed from the fetch stage 26 pipeline (in this example, A+0x8 in the FETCH2 stage 52).

In response to the first instruction address A missing in the instruction cache 18, a second instruction fetch address is prefetched during the L2 cache 20 access time for the first instruction A. In response to the BTA flag in the FETCH1 stage 50, the branch target address B is prefetched rather than the address of the next sequential cache line to A's fetch group. Accordingly, the address B is selected by the prefetch selection mux 30 (selecting FETCH1), and loaded into the prefetch register 42 in cycle four. Also during cycle four, the branch target address B and the BTA flag proceed to the FETCH2 stage 52, and the address B is incremented by the incrementer 46 and loaded into the FETCH1 stage 50 by the cache access steering logic 44.

In cycle five, the entire fetch stage 26 pipeline is flushed to clear the way for the prefetch operation. During the sixth and seventh processing cycles, the cache access steering logic 44 directs the prefetch address B to the fetch stage 26 pipeline and a cache 18 access—but not a BTAC 38 or BHT 40 access—is performed. Also in cycle seven, the first instruction address A is re-loaded into the fetch stage 26 pipeline by the cache access steering logic 44, from the refetch register 56.

The second, or prefetch, address B misses in the instruction cache 18 (cycle seven), thus resulting in an L2 cache 20 request being issued for address B in cycle eight. Note that if the address B hit in the instruction cache 18, the prefetch operation is complete and the processor knows that the instructions associated with address B reside in the instruction cache 18 and an L2 cache 20 access is not required.

Also in cycle eight, the address A (again) misses in the instruction cache 18. Since the first instruction address A entered the cache access steering logic 44 from the refetch register 56 and not the prefetch register 42, a fetch operation, not a prefetch operation, is performed using the address A. Accordingly, the BTAC 38 and BHT 40 are also accessed, resulting in a BTAC 38 hit and a taken branch prediction for the first instruction A. This results in flushing, in cycle nine, all sequentially incremented addresses behind A (in this example, the FETCH2 stage 52), and loading the branch target address B from the BTAC 38, along with a BTA flag, into the FETCH1 stage 50.

At this point, the relative ordering of the first instruction address A and the branch target address B is restored. The first instruction address A is in the FETCH3 stage 54, awaiting instructions from the L2 cache 20 or main memory. The branch target address B will proceed through the fetch stage 26 pipeline, miss in the instruction cache 18, and eventually come to rest in the FETCH3 stage 54, waiting on the results of its ongoing L2 access. However, the latency experienced in receiving instructions from this L2 access will appear to be reduced, since the request was previously issued in cycle eight—during the latency of the L2 cache 20 access by instruction address A.

FIG. 6 illustrates a cycle-by-cycle movement of instruction addresses through the prefetch and fetch stages 24, 26 of the instruction unit 12 in response to a first instruction address A that misses in the instruction cache 18, and launches an L2 access. In this example, and the fetch group associated with address A contains no known branch instructions, but the fetch group associated with the following address A+0x8 includes a known branch instruction that is predicted taken.

Instruction address A is loaded into the fetch stage 26 pipeline in cycle one, and misses in the instruction cache 18 and BTAC 38 in cycle two. In cycle three, instruction address A proceeds to the FETCH3 stage 54, but does not initiate an L2 cache 20 access request until cycle four. This may, for example, be due to a pending cache management operation necessary to free up room to make a new request. During cycle three, prior to instruction address A making an L2 request, the instruction address A+0x8 for the next sequential fetch group misses in the instruction cache 18, but hits in the BTAC 38, and the branch instruction is predicted taken. In response, the branch target address B is steered to the FETCH1 stage 50 by the cache access steering logic 44, and the BTA flag is set, in cycle four.

In cycle five, in response to the L2 cache 20 access request for instruction address A, the prefetch stage 24 initiates a prefetch operation. In response to the BTA flag being set in the FETCH1 stage 50, the branch target address B is steered by the prefetch selection mux 30 and loaded into the prefetch register 42. The instruction address A is stored from the FETCH3 stage 54 to the refetch register 56, and in the following cycle, the fetch stage 26 pipeline is flushed, to clear the way for the prefetch operation.

The prefetch operation proceeds as described above, with the branch target address B missing in the instruction cache 18 (BTAC 39 and BHT 40 accesses being suppressed), and proceeding to the FETCH3 stage 54 to launch an L2 cache 20 request. This completes the prefetch operation, and the instruction address A is re-loaded into the fetch stage 26 pipeline. Via normal fetch operation processing, instruction addresses A+0x8 and B are launched into the fetch stage 26 pipeline, in the proper relative order to receive the instructions from the L2 accesses.

In this example, the instruction address A+0x8 missed in the instruction cache 18, but did not perform an L2 cache 20 access. Where the instruction cache 18, 20 lines are larger than the size of an instruction fetch group, the fetch group associated with the instruction address A+0x8 is statistically likely to be in the same cache line as the fetch group associated with the instruction address A. If this is true, the instructions for both fetch groups are loaded into the instruction cache 18 by the L2 cache 20 access using instruction address A. In the (statistically rare) case where it is not true, the fetch group associated with instruction address A+0x8 must be separately fetched from the L2 cache 20. However, even in this case, the prefetch operation using the branch target address B was effective to load the fetch group associated with the predicted instruction address B into the instruction cache 18 in an efficient manner. Alternatively, if address B hit in the instruction cache 18, the prefetch operation was effective to verify that the associated instructions are resident while avoiding the power drain associated with extracting them from the instruction cache 18 at that time.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of fetching instructions, comprising:
   accessing an instruction cache with a first instruction address that causes a cache miss;
   obtaining a second instruction address comprising a branch target address of a predicted-taken branch instruction, wherein the second instruction address is not associated with a prefetch attribute, but is identified as a predicted branch target address;
   initiating a higher-level memory transaction to retrieve a first instruction associated with the first instruction address; and
   during a latency period of the higher-level memory transaction:
      flushing the first instruction address and the second instruction address from an instruction fetch pipeline, wherein the second instruction address re-enters the instruction fetch pipeline in response to the flushing, wherein the re-entered second instruction address is associated with the prefetch attribute to identify the re-entered second instruction address as a prefetch instruction, and wherein the re-entered second instruction address is not identified as a predicted branch target address; and
      ascertaining whether a second instruction that is associated with the second instruction address is stored in the instruction cache without retrieving any instructions associated with the second instruction address from the instruction cache.

2. The method of claim 1, wherein obtaining the second instruction address comprises accessing a branch target address cache with the first instruction address or with a next address following the first instruction address.

3. The method of claim 2, wherein each entry in the branch target address cache is associated with a corresponding fetch group comprising one or more instructions including a branch instruction that has previously evaluated taken.

4. The method of claim 3, further comprising predicting an evaluation of the branch instruction that has previously evaluated taken.

5. The method of claim 4, wherein predicting the evaluation of the branch instruction further comprises accessing a branch history table that is distinct from the branch target address cache, the branch history table storing indications of past evaluations of the branch instruction using the first instruction address or the next address following the first instruction address.

6. The method of claim 5, wherein obtaining the second instruction address comprises accessing a branch target address cache and accessing a branch history table that is distinct from the branch target address cache, wherein the branch target address cache indicates whether the predicted-taken branch instruction has previously evaluated taken and wherein the branch history table indicates a prediction of whether the predicted-taken branch instruction will be evaluated taken or not taken.

7. The method of claim 1, further comprising, after ascertaining that the instructions associated with the second instruction address are not located in the instruction cache during the latency period of the higher-level memory transaction associated with the first instruction address, initiating a second higher-level memory transaction to retrieve the second instruction.

8. The method of claim 7, wherein the first instruction address is stored in a refetch register when the first instruction address is flushed from the instruction fetch pipeline, wherein the re-entered second instruction address flows through the instruction fetch pipeline to access the instruction cache, and further comprising subsequently reloading the first instruction address from the refetch register into the instruction fetch pipeline.

9. The method of claim 1, wherein the predicted-taken branch instruction is associated with the first instruction address or with a next address following the first instruction address.

10. A method of fetching instructions, comprising:
    initiating a fetch of a first instruction having a first instruction address; and
    upon the first instruction address missing in a first-level instruction cache:
        initiating a first higher-order memory access;
        storing the first instruction address in a register;
        loading a second instruction address into a prefetch register from an instruction fetch pipeline in response to a branch target address flag associated with the second instruction address indicating that the second instruction address is a predicted-taken branch target address of a branch instruction wherein the second instruction address is not associated with a prefetch attribute;
        flushing the first instruction address and the second instruction address from the instruction fetch pipeline in response to the first higher-order memory access being initiated;
        re-entering the second instruction address in the instruction fetch pipeline in response to the flushing,
        wherein upon the second instruction address re-entering the instruction fetch pipeline:
            the prefetch attribute is associated with the second instruction address,
            wherein the prefetch attribute causes the instruction fetch pipeline to not retrieve instructions associated with the second instruction address; and
            the second instruction address is not associated with the branch target address flag; and
        initiating an instruction cache access to locate the second instruction address, the instruction cache access occurring at least partially during the first higher-order memory access, wherein no instructions associated with the second instruction address are retrieved from the instruction cache during the first higher-order memory access.

11. The method of claim 10, wherein the predicted branch target address is retrieved from a branch target address cache indexed by the first instruction address or by a next address following the first instruction address.

12. The method of claim 10, further comprising, when the second instruction address misses in the first-level instruction cache, initiating a second higher-order memory access using the second instruction address during a latency period of the first higher-order memory access.

13. The method of claim 10, wherein the branch instruction is associated with a next address following the first instruction address, wherein when the first higher-order memory access is initiated the second instruction address is within the instruction fetch pipeline and is associated with the branch target address flag, wherein the second instruction address is not associated with the prefetch attribute when the first higher-order memory access is initiated.

14. A processor comprising:
    an instruction cache memory operative to:
        provide one of a hit indication and a miss indication associated with a first instruction address in response to a fetch operation or a prefetch operation; and
        provide a first instruction in response to the fetch operation and the hit indication;
    a higher-order memory operative to provide the first instruction in response to the miss indication;
    an instruction execution pipeline including a fetch stage pipeline;
    a branch prediction circuit operative to detect a branch instruction associated with the first instruction address or with a next address following the first instruction address and to provide a branch evaluation prediction associated with the branch instruction and a predicted branch target address associated with the branch instruction, the branch prediction circuit being further operative to associate a branch target address flag with the predicted branch target address to indicate the branch instruction is predicted taken;
    control circuitry operative to associate a prefetch attribute with the predicted branch target address, wherein the prefetch attribute causes the fetch stage pipeline to not retrieve instructions associated with the predicted branch target address, and to launch an instruction cache access operation in the fetch stage pipeline using the predicted branch target address during an access to the higher-order memory to locate the first instruction address when:
        the fetch operation using the first instruction address misses in the instruction cache memory and launches the access to the higher-order memory to locate the first instruction address; and
        the branch evaluation prediction provided by the branch prediction circuit is predicted taken; and a refetch register operative to store the first instruction address during the access to the higher-order memory to locate the first instruction address after the first instruction address has been flushed from the fetch stage pipeline to allow the predicted branch target address to flow through the fetch stage pipeline, and to reload the first instruction address into the fetch stage pipeline after the predicted branch target address is loaded into the fetch stage pipeline, wherein the predicted branch target address is reloaded into the fetch stage pipeline before the first instruction address has been reloaded into the fetch stage pipeline, wherein the predicted branch target address is not associated with the prefetch attribute prior to the first instruction address being flushed from the fetch stage pipeline, and wherein the predicted branch target address is associated with the prefetch attribute when reloaded into the fetch stage pipeline.

15. The processor of claim 14, wherein the control circuitry is further operative to launch an L2 cache access of the predicted branch target address when the predicted branch target address misses in the instruction cache during the instruction cache access operation.

16. The processor of claim 15, wherein the L2 cache access of the predicted branch target address is launched during a latency period of the access to the higher-order memory to locate the first instruction address.

17. The processor of claim 14, further comprising a branch target address (BTA) flag in the fetch stage pipeline, wherein the control circuitry is further operative to launch the fetch operation in the fetch stage pipeline using the predicted branch target address and to set the BTA flag when the branch prediction circuit detects a branch instruction associated with a first instruction address or the next address following the first instruction address.

18. The processor of claim 17, further comprising a prefetch register operative to store the predicted branch target address from the fetch stage pipeline in response to the BTA flag and further in response to a launch of the access to the higher-order memory.

19. The processor of claim 18, wherein the prefetch register is operative to store an address of a next sequential cache line calculated from the first instruction address when the higher-order memory access is launched and when there is not a BTA flag in the fetch stage pipeline.

20. The processor of claim 14, further comprising a prefetch multiplexer coupled to provide a selected instruction address to a prefetch register, wherein the prefetch multiplexer is configured to select the selected instruction address from multiple instruction addresses at the fetch stage pipeline in response to the branch target address (BTA) flag being associated with the selected instruction address in the fetch stage pipeline.

21. A method of fetching instructions, the method comprising:
fetching an instruction having a first instruction address that misses in a first-level instruction cache and initiates a higher-order memory access to locate the first instruction address, wherein the first instruction address is stored in a fetch pipeline;
when a branch instruction associated with the first instruction address or with a next address following the first instruction address is predicted taken, initiating an instruction cache content addressable memory (CAM) access to locate a second instruction having a second instruction address in an instruction cache, wherein the second instruction address is a predicted branch target address associated with the branch instruction and is associated with a branch target address flag indicating the second instruction address is the predicted branch target address, wherein the instruction cache CAM access occurs at least partially during the higher-order memory access to locate the first instruction address, wherein the second instruction address is associated with a prefetch attribute that indicates no instructions associated with the second instruction address are retrieved from the instruction cache CAM during the higher-order memory access to locate the first instruction address, wherein an address of the branch instruction is stored in a register and flushed from the fetch pipeline, and wherein the address stored in the register is reloaded into the fetch pipeline after the second instruction address is loaded into the fetch pipeline, wherein the address stored in the register is reloaded into the fetch pipeline after the second instruction address has been reloaded into the fetch pipeline, wherein the second instruction address is not associated with the prefetch attribute prior to the address of the branch instruction being flushed from the fetch pipeline, and wherein the second instruction address is associated with the prefetch attribute when reloaded into the fetch pipeline; and when no predicted-taken branch instruction is associated with the first instruction address or with a next address following the first instruction address, initiating the instruction cache content addressable memory (CAM) access to locate a third instruction having a third instruction address in the instruction cache, wherein the third instruction address is an address of a next sequential instruction cache line following a cache line addressed by the first instruction address, wherein the instruction cache CAM access to locate the third instruction occurs during the higher-order memory access to locate the first instruction address and the prefetch attribute associated with the third instruction address indicates no instructions associated with the third instruction address are fetched from the instruction cache CAM while fetching the instruction having the first instruction address, wherein the first instruction address or the next address following the first instruction address is saved in the register and flushed from the fetch pipeline, and wherein the address stored in the register is reloaded into the fetch pipeline after the third instruction address is loaded into the fetch pipeline.

22. The method of claim 21, further comprising re-fetching the first instruction address following the instruction cache CAM access.

23. A method comprising:
loading a first instruction address into a pipeline;
loading a second instruction address with a branch target address (BTA) flag into the pipeline, wherein the BTA flag indicates the second instruction address is a predicted-taken branch target address, and wherein the second instruction address is not associated with a prefetch attribute;
wherein the first instruction address causes a cache miss;
flushing the first instruction address and the second instruction address from the pipeline in response to the cache miss; and
in response to flushing the first instruction address and the second instruction address from the pipeline in response to the cache miss, loading the second instruction address without the BTA flag and with a prefetch attribute into the pipeline, wherein the prefetch attribute causes the pipeline to not retrieve instructions associated with the second instruction address.

24. The method of claim 23, further comprising:
loading the second instruction address into a prefetch register from the pipeline in response to the BTA flag.

25. The method of claim 24, wherein the pipeline is flushed in response to a higher-order memory access being initiated in response to the cache miss, and further comprising initiating an instruction cache access to locate the second instruction address.

26. The method of claim 25, wherein the instruction cache access occurs at least partially during the higher-order memory access.

* * * * *